United States Patent
Timner et al.

(10) Patent No.: US 12,483,943 B2
(45) Date of Patent: Nov. 25, 2025

(54) REDUCING SIGNALLING OVERHEAD IN HANDOVER PREPARATION

(71) Applicant: Telefonaktiebolaget LM Ericsson (publ), Stockholm (SE)

(72) Inventors: Ylva Timner, Luleå (SE); Lian Araujo, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 509 days.

(21) Appl. No.: 17/798,425

(22) PCT Filed: Feb. 12, 2021

(86) PCT No.: PCT/SE2021/050115
§ 371 (c)(1),
(2) Date: Aug. 9, 2022

(87) PCT Pub. No.: WO2021/162619
PCT Pub. Date: Aug. 19, 2021

(65) Prior Publication Data
US 2023/0080741 A1    Mar. 16, 2023

Related U.S. Application Data

(60) Provisional application No. 62/975,986, filed on Feb. 13, 2020.

(51) Int. Cl.
*H04W 36/00*         (2009.01)
(52) U.S. Cl.
CPC ............................... *H04W 36/0064* (2023.05)

(58) Field of Classification Search
CPC ............... H04W 8/22; H04W 36/0055; H04W 36/0058; H04W 36/0064; H04W 36/08; H04W 72/04; H04W 92/20
(Continued)

(56) References Cited

U.S. PATENT DOCUMENTS

2021/0105671 A1* 4/2021 Van Der Velde ... H04W 36/185
2022/0174557 A1* 6/2022 He ..................... H04W 36/0055

FOREIGN PATENT DOCUMENTS

WO    WO-2020162802 A1 * 8/2020

OTHER PUBLICATIONS

"On the UE Capability ID usage in RAN side", 3GPP TSG-RAN2 Meeting #106, R2-1907227, Huawei, HiSilicon, Reno USA, May 13-17, 2019, 3 pages.
(Continued)

*Primary Examiner* — Harun Chowdhury
(74) *Attorney, Agent, or Firm* — Murphy, Bilak & Homiller, PLLC

(57) ABSTRACT

The disclosure provides a method performed by a base station. The method comprises, when the base station is acting as a source base station for handover of a wireless device to a target base station: preparing a handover message for transmission to the target base station, the handover message comprising an indication of an identity associated with a set of capabilities of the wireless device; and causing the handover message to be transmitted to the target base station. The step of preparing the handover message comprises selectively including the set of capabilities of the wireless device in the handover message based on one or more criteria.

5 Claims, 10 Drawing Sheets

(58) Field of Classification Search
USPC .......................................... 370/235, 329, 331
See application file for complete search history.

(56) References Cited

OTHER PUBLICATIONS

"ETSI TS 123 502 V15.8.0", 5G; Procedures for the 5G System (5GS) (3GPP TS 23.502 version 15.8.0 Release 15), Jan. 2020, 1-362.

3GPP, "Technical Specification Group Services and System Aspects; Procedures for the 5G System; Stage 2", 3GPP TS 23.502, v16.3.0, Dec. 2019, 1-558.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.8.0, Dec. 2019, 1-317.

3GPP, "3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.

3GPP, "3rd Generation Partnership Project; Technical Specification Group Services and System Aspects; System architecture for the 5G System (5GS); Stage 2 (Release 16)", 3GPP TS 23.501 V16.3.0, Dec. 2019, 1-417.

Ericsson, "Inter-node signaling of UE Capabilities", 3GPP TSG-RAN WG2 #109-e, Tdoc R2-2001227, Electronic meeting, Feb. 24-Mar. 6, 2020, 1-2.

Huawei, et al., "Capability IDS storage and usage in RAN", 3GPP TSG-RAN3 Meeting #103, R3-190881, Athens, Greece, Feb. 25-Mar. 1, 2019, 1-2.

Huawei, et al., "On the storage of UE Capability ID in RAN side", 3GPP TSG-RAN2 Meeting#105bis, R2-1904624, Xian, China, Apr. 8-12, 2019, 1 page.

ZTE Corporation, et al., "Consideration on UE radio capability ID signaling in inter-node RRC messages", 3GPP TSG-RAN WG2 Meeting#107bis, R2-1912672, Chongqing, China, Oct. 14-18, 2019, 1-5.

ZTE Corporation, et al., "UE radio capability ID exchange over X2/Xn and S1/NG interface", 3GPP TSG-RAN WG2 Meeting#108, R2-1915079, Reno, USA, Nov. 18-22, 2019, 1-13.

* cited by examiner

REDUCING SIGNALLING OVERHEAD IN HANDOVER PREPARATION

TECHNICAL FIELD

Embodiments of the disclosure relate to wireless communication networks, and particularly to methods, apparatus and machine-readable media for handover in wireless communication networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

There can be different types of User Equipments (UEs) in a communications network. The 3rd Generation Partnership Project (3GPP) standardizes different standards for wireless communication, e.g., known as Global System for Mobile communication (GSM), Wideband Code Division Multiplexing Access (WCDMA), Long-Term Evolution (LTE) and now also New Radio (NR), the new generation commonly referred to as 5th Generation (5G). These different abbreviations are really denotations of different radio access technologies. UEs operating in these networks can be capable of communicating using one of these technologies/generations, or they may support several. Similarly, there are many different frequencies that are used for wireless communication and some UEs may support communication on some frequency bands whereas other UEs may support communication on other frequency bands. Also, for each frequency band, there may be different levels of complexity in supporting, e.g., different numbers of input/output streams (such as MIMO streams) and this can mean that to properly describe what functionality a UE can support at a particular time can be quite complex.

In 3GPP, a UE informs the network about its communication capabilities through a transmission of a UE Radio Access Capabilities message. It does this such that the network will have information available on how best to configure communication paths or connections between the UE and the network. These connections can for example be communicated to the radio access nodes, i.e., in 3GPP known as gNB for NR/5G, Evolved Universal Terrestrial Radio Access Network (E-UTRAN) NodeB (eNB) for LTE/Evolved Universal Terrestrial Radio Access (EUTRA), etc. With the information available in the Radio Access Network (RAN) nodes, it would be possible to know which features to turn on and activate, which features not to activate, on what frequencies, etc. However, adding more and more features and supporting more and more frequencies in the standard have resulted in the UE Radio Access Capabilities specified by 3GPP increasing in size, making it very costly in terms of network resource usage as well as processing in both the UE and the nodes when the capabilities need to be transferred between relevant network entities, e.g. between UE Access and Mobility Management Function (AMF) and NG-RAN.

In order to address this issue, 3GPP Release 16 introduces a new concept known as Radio Access Capability Signalling (RACS) ID (also referred to as Capability ID herein). According to this concept, RACS IDs are associated with particular sets of capabilities in the network, such that only the capability ID (and not the UE capabilities themselves) need be signaled in order to inform the network of the UE's radio access capabilities at events such as initial registration and on internal interfaces at idle mode mobility and handover (HO).

The mappings between particular Capability IDs and their corresponding or associated sets of UE capabilities may be stored in a core network function known as UE Capability Management Function (UCMF). However, other entities such as the AMF and base station (e.g., eNB, gNB etc) may also store a cache of some mappings, such as the most common mappings.

SUMMARY

There currently exist certain challenge(s).

When a UE arrives in a cell, the gNB receives the Capability ID for the UE from the AMF. If the Capability ID is not recognized by the gNB, it may request the UE capabilities from the AMF. If the AMF does not recognize the Capability ID, it will request the UE capabilities from the UCMF.

During handover of a UE from a source base station to a target base station, if both the source base station and the target base station support RACS the source to target transparent container (contained in a message from the source base station to the target base station) contains the UE's Capability ID and not the UE's capabilities themselves. However, particularly for unusual UE models (which may have unusual capabilities), this may increase the handover (HO) delay by effectively adding at least one round-trip between the gNB and AMF (i.e., where the target base station does not recognize the capability ID). Unusual models might be smartphone models that are very new, old or not marketed in the current country, or specialized equipment for public safety or critical IoT. It may not be feasible for base stations to cache the capability IDs of all UE models, so for more unusual models (such as those described above), the gNB will have to request it from the AMF and this will lead to delay at handover. Particularly for those UEs with delay-critical services, extra HO delay is not acceptable.

One option might be to always include the UE capabilities at HO, thus ensuring that there is no extra HO delay. However, signaling load on internal interfaces will be unnecessarily high.

Alternatively, it may be optional whether to send the UE capabilities or not. However, in this case there is no well described method for deciding whether to send the UE capabilities or not.

Certain aspects of the present disclosure and their embodiments may provide solutions to these or other challenges. According to some embodiments of the disclosure, when RACS is used and the UE has a valid RACS ID, the base station decides whether or not to send the UE capabilities together with the RACS ID. The decision may be based on input such as one or more of: how common the Capability ID of the UE is, the type of ID (Network assigned or Manufacturer assigned), the QoS requirements of the active flows of the UE, the network slice of the UE, capacity on X2/N2 interface and load on the X2/N2 interface.

There are, proposed herein, various embodiments which address one or more of the issues disclosed herein. For example, one embodiment provides a method performed by a base station. The method comprises, when the base station is acting as a source base station for handover of a wireless device to a target base station: preparing a handover message for transmission to the target base station, the handover message comprising an indication of an identity associated with a set of capabilities of the wireless device; and causing the handover message to be transmitted to the target base station. The step of preparing the handover message comprises selectively including the set of capabilities of the wireless device in the handover message based on one or more criteria.

Certain embodiments may provide one or more technical advantage(s), such as reducing or minimizing overhead on internal interfaces, while avoiding additional delay or latency during handover.

DETAILED DESCRIPTION

Figure 1:
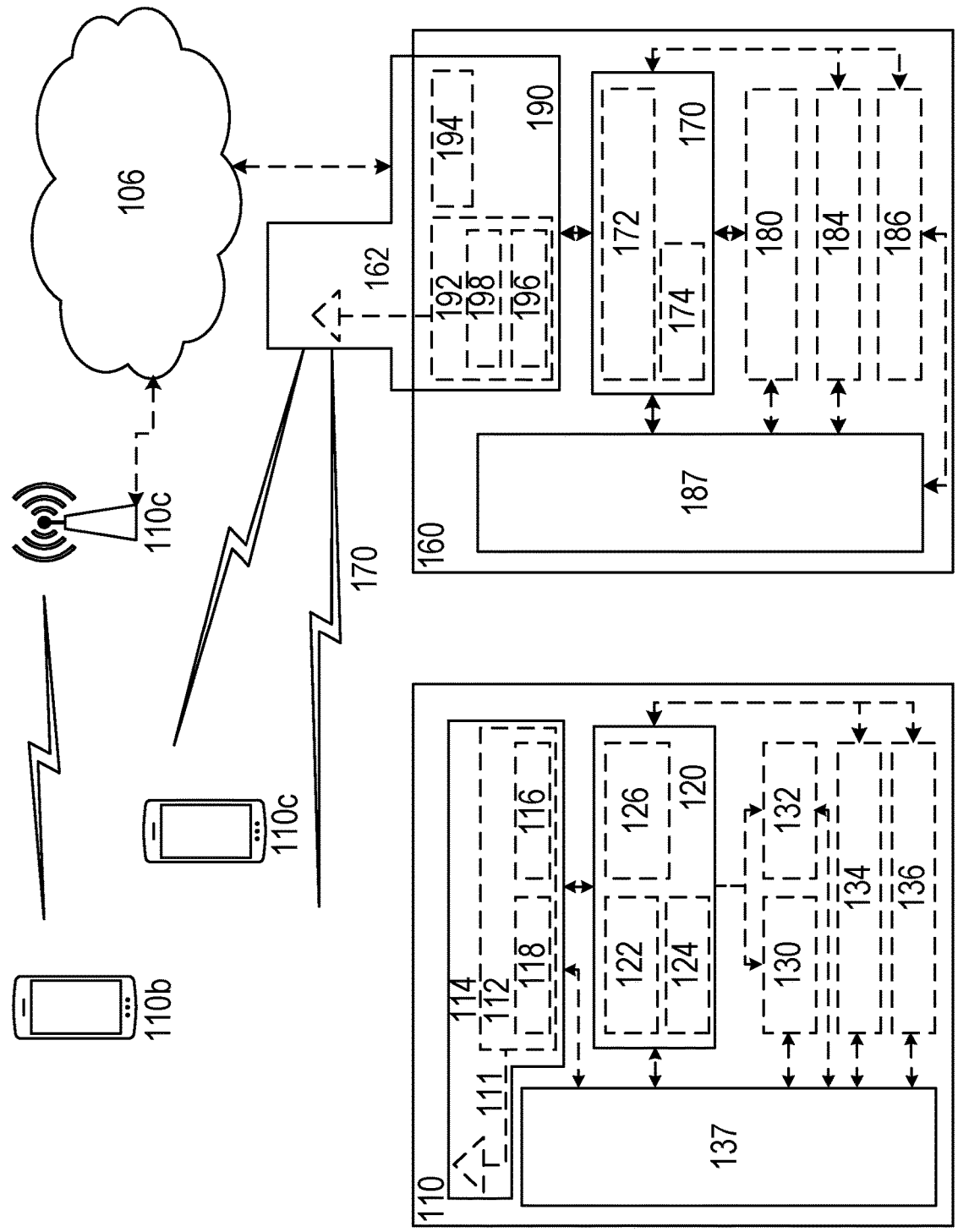
FIG. 1 shows a wireless network in accordance with some embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

In the following description, the abbreviation gNB is frequently used to refer to a network node or base station. Those skilled in the art will appreciate that embodiments of the disclosure additionally or alternatively relate to other radio access technologies than New Radio (in which the acronym gNB is used), such as LTE (in which the acronym eNB is used), Universal Mobile Telecommunication System, UMTS, (in which the acronym NodeB is used) and others.

When preparing for a HO for a UE that has a valid capability ID, the source gNB will include the capability ID in the HO preparation message sent to the target gNB, (as standardized for RACS). However, the source gNB will also include the UE radio access capabilities if it decides that it is beneficial in order to avoid extra HO delay.

There are several methods for the source gNB to decide if the UE radio access capabilities should be included. For example, if the capacity of the internal interface is above a threshold, the source gNB may decide to include UE capabilities in the message. The internal interface may be X2 in case of X2 HO, or N2 if N2 HO is used.

The source gNB may monitor the load on internal interfaces towards neighboring cells, for example, and if the load on the interface towards the target gNB is below a threshold, the UE capabilities are included in the message.

In another example, the UE capabilities may be included in the HO command in all X2 HO, but not N2 HO. This may be particularly useful if the capacity is limited on N2 but not X2, for example. Alternatively, the UE capabilities may be included in the HO command in all N2 HO, but not X2 HO. This may be useful if the capacity is limited on X2 but not N2, or if extra HO delay is acceptable for X2 HO but not N2 HO.

If the UE belongs to a prioritized slice or delay sensitive slice, the UE capabilities may be included in the HO command. If the UE have one or more QoS-flows that are prioritized and/or delay sensitive, the UE capabilities may be included in the HO command.

The source gNB may be pre-provisioned with the mappings of some Capability IDs, and may thus include the UE capabilities in the message for all UEs with capability IDs that were not pre-provisioned.

In embodiments in which the network is using both Manufacturer assigned IDs and network assigned IDs, the UE capabilities may be included in the message for all network assigned IDs.

The gNB may keep track of how common different capability IDs are in its respective cell, and for capability IDs that are not common, the UE capabilities are included in the message.

The gNB may decide not to include the UE capabilities based on target Radio Access Technology (RAT) node. For inter-RAT handover, the gNB may decide not to include the UE capabilities, since encoding for target RAT capabilities can be different; while for intra-RAT handover, the gNB may decide to include the UE capabilities.

The skilled person will appreciate that, in general, the gNB may use any of the methods described above, or a combination thereof, to decide if the UE radio access capabilities should be included.

An example of how to enable the possibility for a gNB not to include UE capabilities when sending a UE capability ID to another node is given below, for 38.331:

NOTE 1: The following table indicates per source RAT whether RAT capabilities are included or not when RACS is not used for the UE. If RACS is used for the UE, all UE radio access capabilities are optional.

| Source RAT | NR capabilites | E-UTRA capabilities | MR-DC capabilities |
|---|---|---|---|
| NR | Included | May be included | May be included |
| E-UTRAN | Included | May be included | May be included |

NOTE 2: The following table indicates, in case of inter-RAT handover from E-UTRA, which additional IEs are included or not:

| Source system | sourceConfig | rrm-Config | as-Context |
|---|---|---|---|
| E-UTRA/EPC | Not included | May be included | Not included |
| E-UTRA/5GC | May be included, but only radioBearerConfig is included in the RRCReconfiguration. | May be included | Not included |

FIG. 1 shows a wireless network in accordance with some embodiments. Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers, MSCs, Mobility Management Entities, MMEs), Operation and Maintenance (O&M) nodes, Operations Support System (OSS) nodes, Self Optimized Network (SON) nodes, positioning nodes (e.g., Evolved-Serving Mobile Location Centres, E-SMLCs), and/or Minimization of Drive Tests (MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 2:
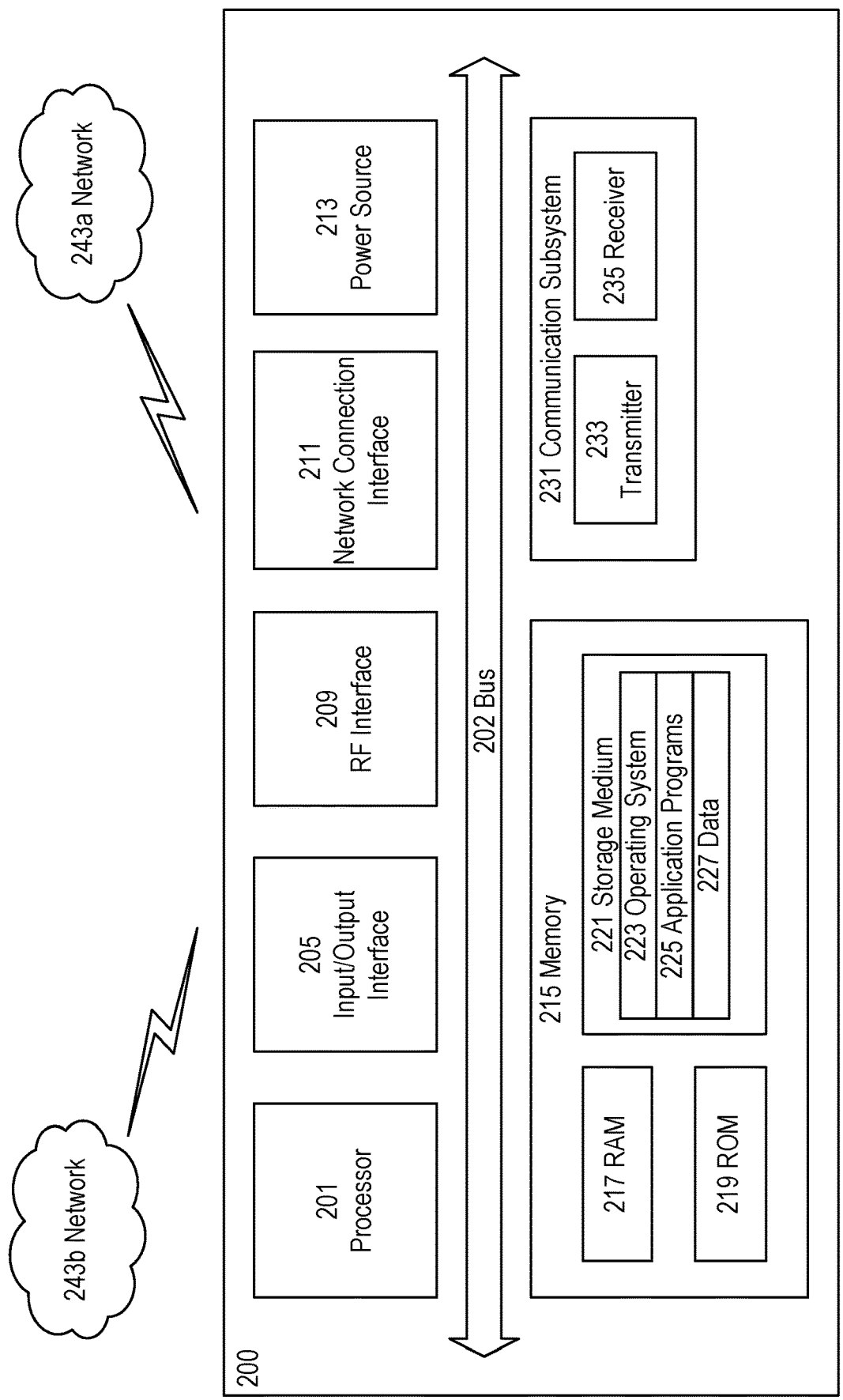
FIG. 2 shows a user equipment in accordance with some embodiments.

FIG. 2 shows a User Equipment in accordance with some embodiments. FIG. 2 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 2, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 2 is a UE, the components discussed herein are equally applicable to a WD, and vice-versa.

In FIG. 2, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 2, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 2, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 2, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 3:
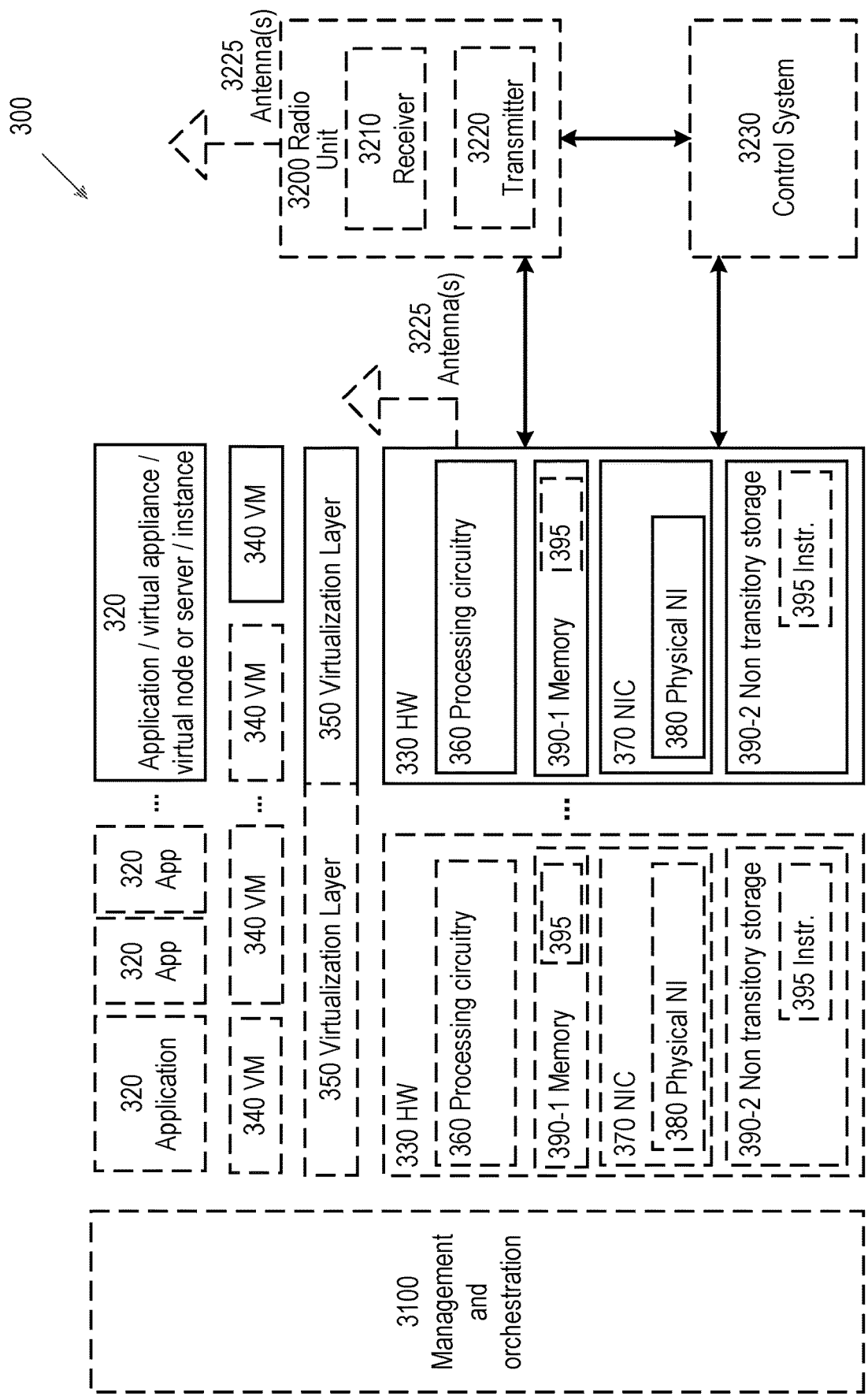
FIG. 3 shows a virtualization environment in accordance with some embodiments.

FIG. 3 shows a virtualization environment in accordance with some embodiments. FIG. 3 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 3, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 3.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 4:
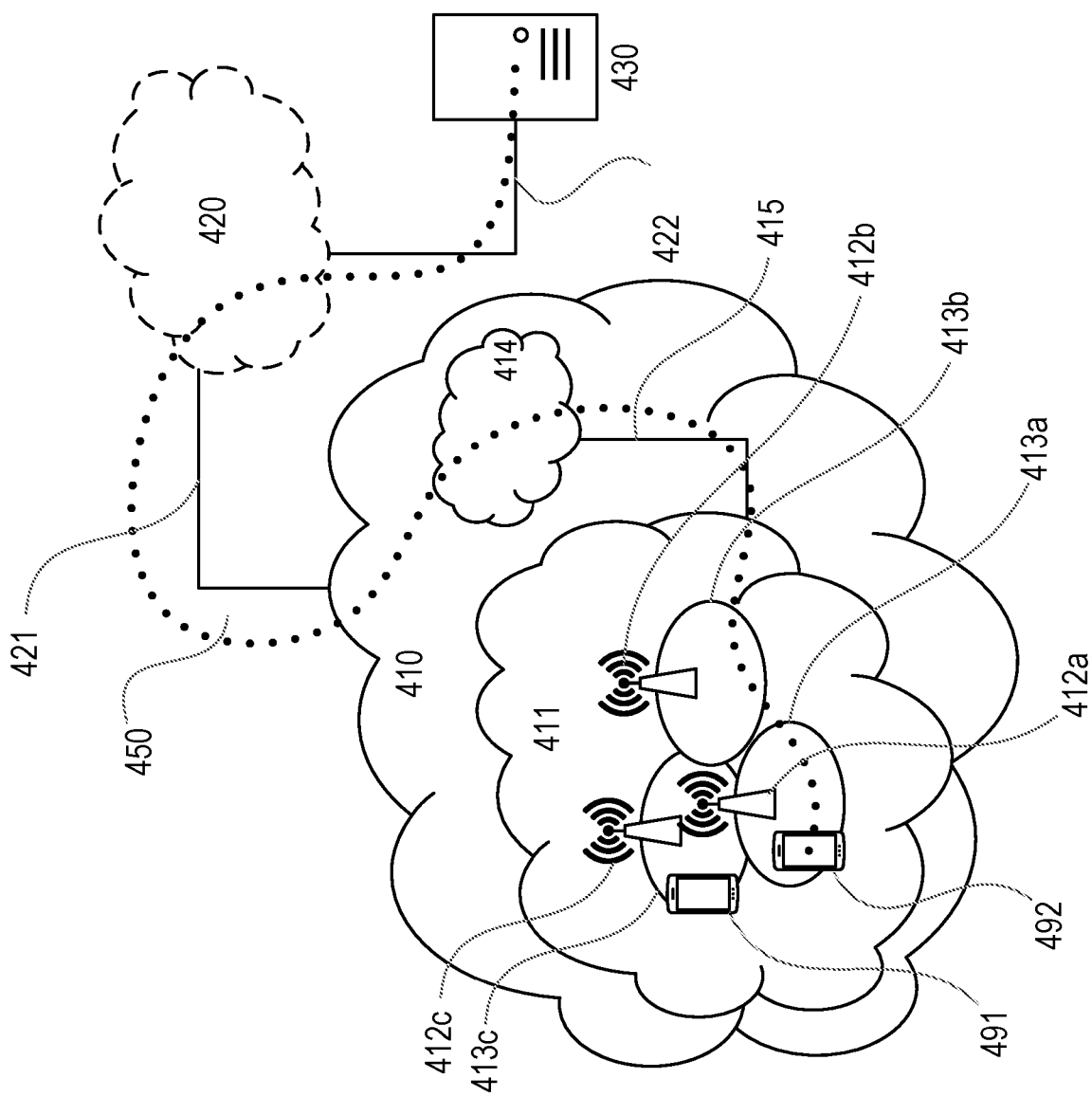
FIG. 4 shows a telecommunication network connected via an intermediate network to a host computer in accordance with some embodiments.

FIG. 4 shows a telecommunication network connected via an intermediate network to a host computer in accordance with some embodiments. With reference to FIG. 4, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 4 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 5:
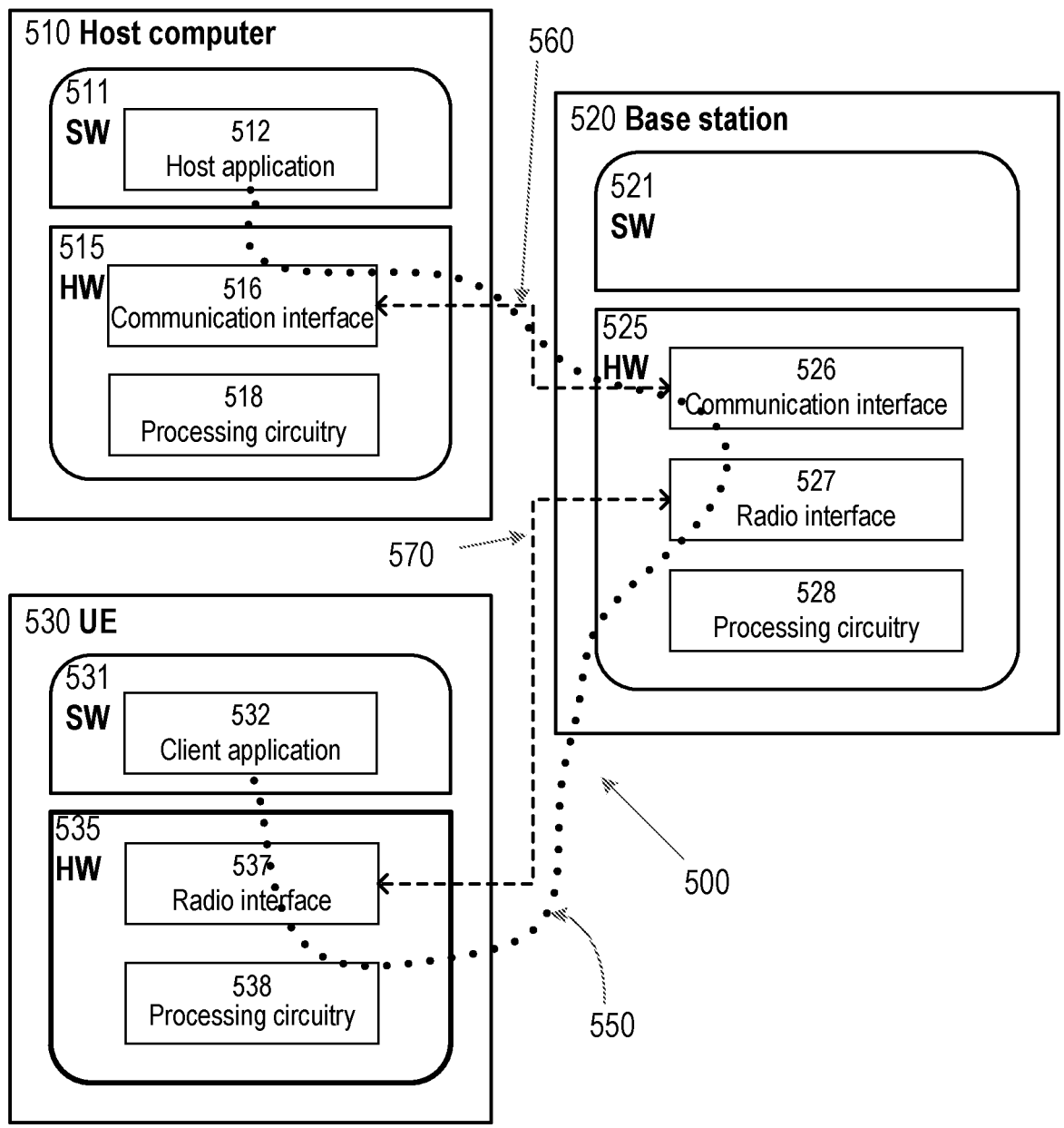
FIG. 5 shows a host computer communicating via a base station with a user equipment over a partially wireless connection in accordance with some embodiments.

FIG. 5 shows a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 5. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 5) served by base station 520. Communication interface 526 may be configured to facilitate connection 560 to host computer 510. Connection 560 may be direct or it may pass through a core network (not shown in FIG. 5) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 5 may be similar or identical to host computer 430, one of base stations 412a, 412b, 412c and one of UEs 491, 492 of FIG. 4, respectively. This is to say, the inner workings of these entities may be as shown in FIG. 5 and independently, the surrounding network topology may be that of FIG. 4.

In FIG. 5, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the latency of communications during handover and thereby provide benefits such as better responsiveness and reduced user waiting time.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 6:
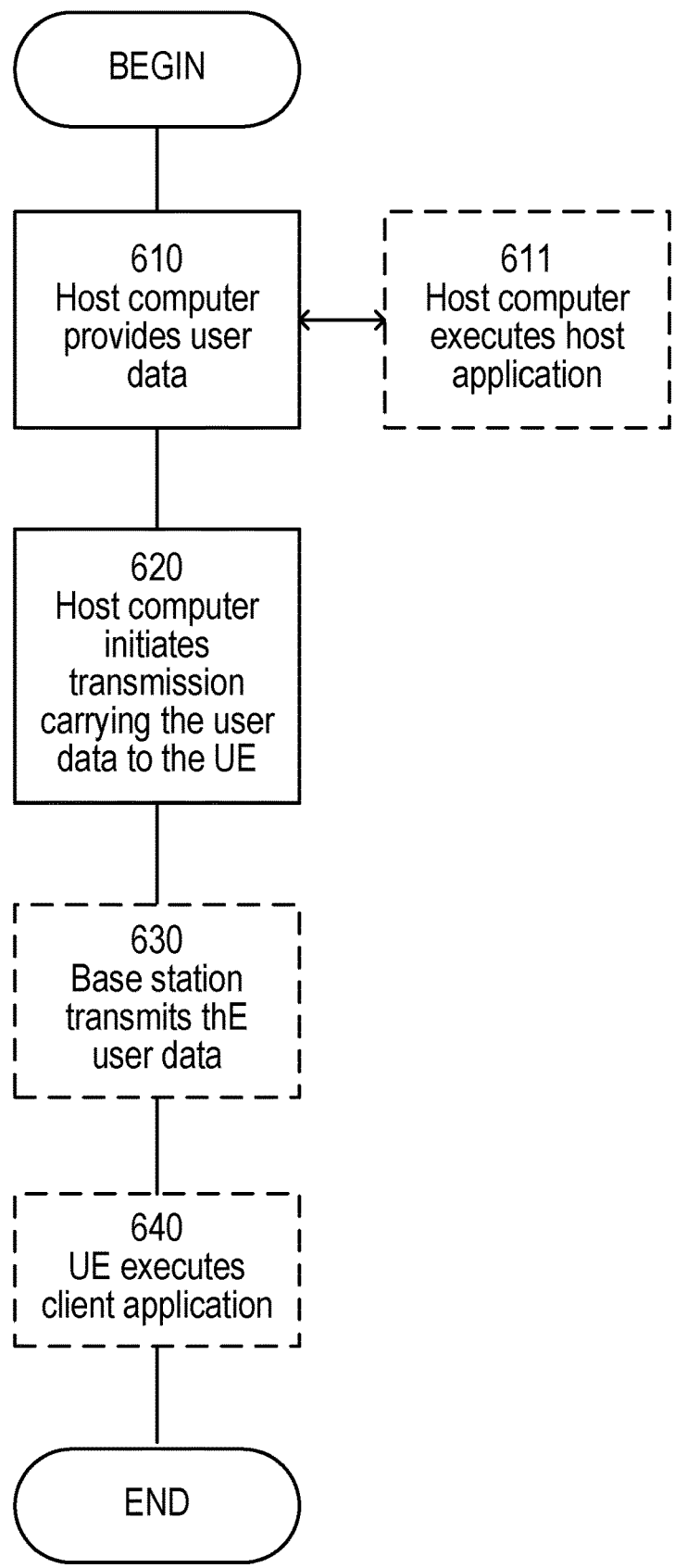
FIG. 6-9 show flowcharts of methods implemented in a communication system including a host computer, a base station and a user equipment in accordance with some embodiments.

FIG. 6 shows a flowchart of a method implemented in a communication system including a host computer, a base station and a user equipment in accordance with some embodiments. FIG. 6 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 6 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 7:
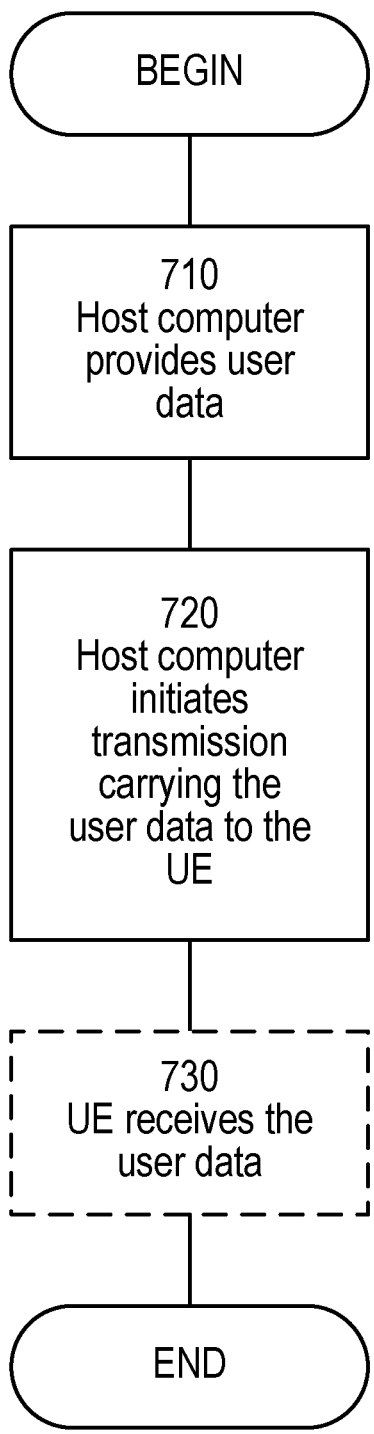

FIG. 7 shows a flowchart of a method implemented in a communication system including a host computer, a base station and a user equipment in accordance with some embodiments. FIG. 7 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 7 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 8:
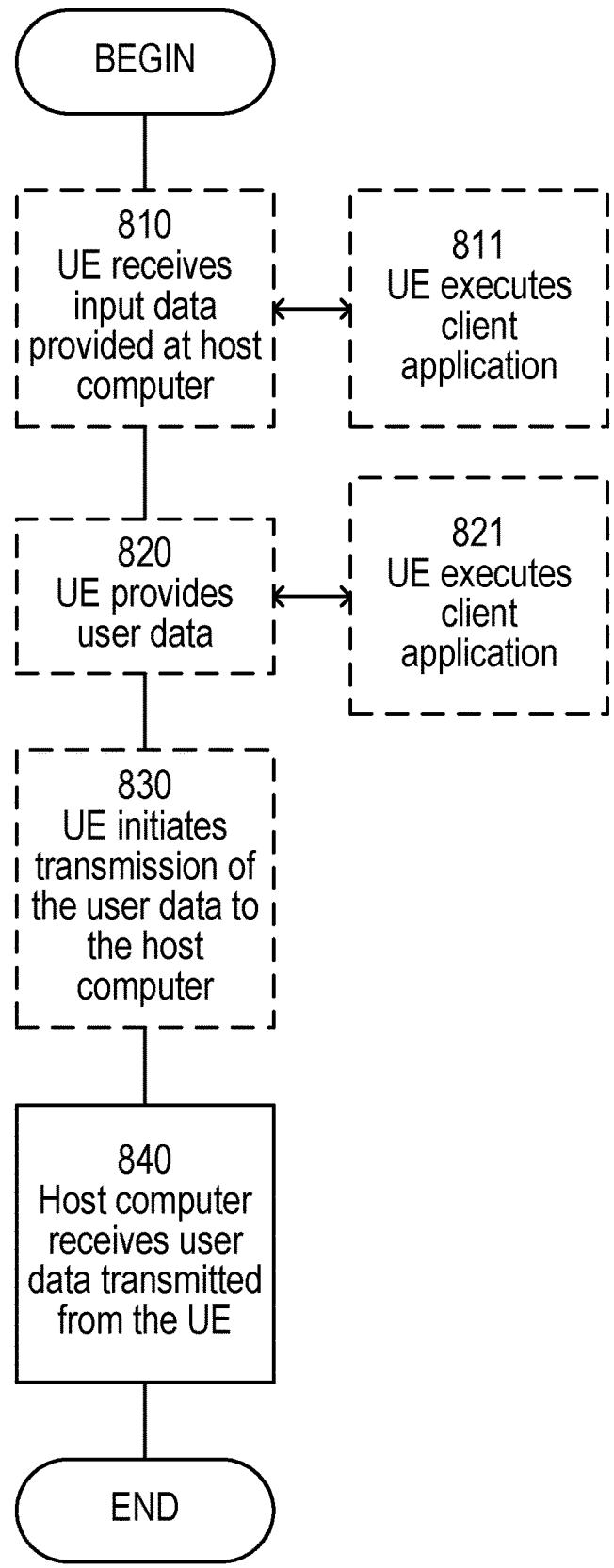

FIG. 8 shows a flowchart of a method implemented in a communication system including a host computer, a base station and a user equipment in accordance with some embodiments. FIG. 8 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 8 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 9:
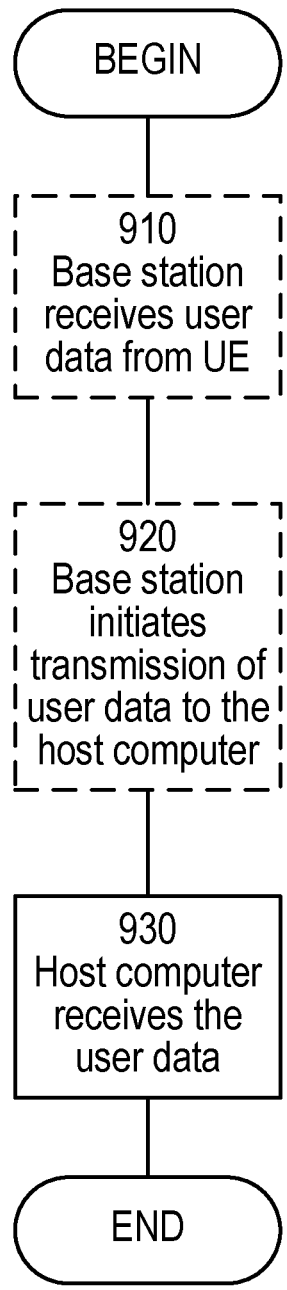

FIG. 9 shows a flowchart of a method implemented in a communication system including a host computer, a base station and a user equipment in accordance with some embodiments. FIG. 9 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 9 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 10:
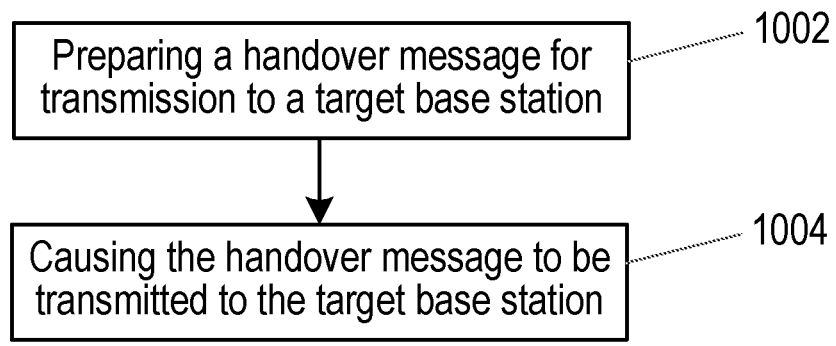
FIG. 10 shows a flowchart of a method according to embodiments of the disclosure.

FIG. 10 depicts a method in accordance with particular embodiments. The method may be performed by a network node such as a base station (e.g., network node 160 described above), and particularly a base station acting at the source base station or network node during handover of a wireless device to a target base station or network node. In one embodiment, both the base station and the target base station are capable of handling IDs associated with sets of capabilities for wireless devices (e.g., both the base station and the target base station are RACS-capable). The readers attention is also drawn to the passage of the description above, prior to the description of FIG. 1, which sets out embodiments of the disclosure performed by the base station and should be read in conjunction with this description.

The method begins at step 1002, in which the base station prepares a handover message for transmission to the target base station. For example, the handover message may comprise a handover request message. The handover message may be prepared following a trigger event, such as one or more radio measurements reported by the wireless device meeting one or more criteria for handover. For example, the reported radio measurements may comprise values for one or more radio metrics such as reference signal received strength, signal to noise ratio, reference signal received quality, etc, as measured on signals transmitted by the base station (which may act as a serving base station for the wireless device) and also by one or more nearby or neighbouring base stations (which may include the target base station). The criteria for handover may be based on a comparison of the measured values to one or more thresholds, and/or the comparison of a difference between measured values for the base station and the one or more nearby or neighbouring base stations to one or more thresholds. Those skilled in the art will appreciate that many different events may act as trigger events for the handover of a wireless device from one base station to another.

The handover message comprises an identity (such as a RACS identity) associated with a set of capabilities of the wireless device. The identity may be mappable by the network to an associated set of capabilities of the wireless device (UE Capabilities or UE Radio Access Capabilities). For example, a core network entity such as the UE Capability Management Function (UCMF) may store the mappings between particular identities and their corresponding sets of capabilities. Additionally or alternatively, the base station itself and/or another function such as the Mobility Management Entity (MME) or Access and Mobility Management Function (AMF) may store mappings between the identities and their corresponding sets of capabilities. In one embodiment, the UCMF stores the mappings for all identities (e.g., all identities in the network or part of the network served by the UCMF), while the base station and/or the AMF cache only mappings for a subset of the identities.

Those skilled in the art will appreciate that the set of capabilities may comprise a wide range of different information including, as examples, one or more of: frequencies on which the wireless device is capable of transmitting and/or receiving; radio access technologies the wireless device is capable of using; a number of input/output streams (such as MIMO streams) which the wireless device is capable of supporting; and different features of wireless standards that the wireless device is capable of supporting.

According to embodiments of the disclosure, in step 1002 the base station additionally selectively includes in the handover message the set of capabilities of the wireless device (i.e., in addition to the identity associated with that set of capabilities) based on one or more criteria.

The one or more criteria may include one or more criteria which relate to the interface or interfaces over which the handover message is to be transmitted (e.g., direct interfaces between the base station and the target base station, such as X2 and/or Xn; indirect interfaces via the core network such as S1 and/or N2). For example, the one or more criteria may comprise a first criterion based on a capacity of the one or more interfaces involved in the handover of the wireless device. Here the term "capacity" may relate to the total capacity of the interfaces regardless of the load on those interfaces. The first criterion may be satisfied (e.g., such that the set of capabilities are included in the handover message) upon the capacity of the one or more interfaces exceeding a threshold capacity.

In another embodiment, the one or more criteria may comprise a second criterion based on a load on the one or more interfaces involved in the handover of the wireless device. The load may be measured in absolute terms or relative terms (e.g., as a percentage or fraction of the total capacity of the interface). Here, the second criterion may be satisfied upon the load on the one or more interfaces being lower than a threshold load.

In another embodiment, the one or more criteria may comprise a third criterion based on a type of the one or more interfaces involved in the handover of the wireless device. For example, in one embodiment, the third criterion may be satisfied upon the type of one or more interfaces including an N2 interface (such that the set of capabilities is included for handover messages transmitted over an N2 interface, but not included for handover messages transmitted over an X2 interface for example). In an alternative embodiment, the third criterion may be satisfied upon the type of one or more interfaces including an X2 interface (such that the set of capabilities is included for handover messages transmitted over an X2 interface, but not included for handover messages transmitted over an N2 interface for example).

Further criteria may relate to the type of communications that the wireless device is handling, and particularly the priority or latency requirements of those communications.

For example, in one embodiment, the one or more criteria comprise a fourth criterion based on a network slice in which the wireless device is configured. The fourth criterion may be satisfied (such that the set of capabilities is included in the handover message) upon the wireless device being configured in a high-priority or delay-sensitive network slice. For example, the priority of the network slice may be compared to a threshold, with the set of capabilities being included if the priority exceeds the threshold. Similarly, the delay requirements of the network slice may be compared to a threshold, with the set of capabilities being included if the delay requirement is less than the threshold. Additionally or alternatively, the fourth criterion may be considered satisfied upon the wireless device being configured in a network slice handling ultra-reliable low-latency communications (URLLC).

In another embodiment, the one or more criteria comprise a fifth criterion based on a quality-of-service (QoS) flow handled by the wireless device. The fifth criterion may be satisfied upon the wireless device handling a quality-of-service flow with high priority or low-latency requirements.

In further embodiments, the one or more criteria may comprise a sixth criterion based on one or more identities with which the base station is pre-provisioned. For example, the base station may be configured with a plurality of identities (and their corresponding mapping to sets of capabilities) by a core network node (e.g., the UCMF) or be pre-programmed with such identities and mappings upon implementation of the base station in the network. The sixth criterion may be satisfied upon the identity associated with the set of capabilities of the wireless device not belonging to the one or more identities with which the base station is pre-provisioned. That is, if the identity associated with the set of capabilities is one of the identities with which the base station is pre-provisioned, it may not include the set of capabilities in the handover message (e.g., because it may be assumed that the target base station is already likely to store that identity and its associated mapping).

In further embodiments, the one or more criteria comprise a seventh criterion based on whether the identity associated with the set of capabilities of the wireless device was assigned by a manufacturer of the wireless device. The seventh criterion may be satisfied upon the identity associated with the set of capabilities of the wireless device not being assigned by the manufacturer of the wireless device.

In a related embodiment, the one or more criteria comprise an eighth criterion based on whether the identity associated with the set of capabilities of the wireless device was assigned by one or more network nodes. The eighth criterion may be satisfied upon the identity associated with the set of capabilities of the wireless device being assigned by one or more network nodes.

In a further embodiment, the base station may store information relating to the prevalence of particular identities (e.g., how commonly wireless devices with capabilities corresponding to those identities connect to the base station). Thus, in such embodiments, the one or more criteria may comprise a ninth criterion based on a prevalence of the identity associated with the set of capabilities of the wireless device. The ninth criterion may be satisfied (such that the set of capabilities is included in the handover message) upon the prevalence of the identity being less than a threshold.

In a yet further embodiment, the one or more criteria comprise a tenth criterion based on whether the target base station uses the same or a different radio access technology as the base station (e.g., whether the handover is intra-RAT or inter-RAT). The tenth criterion may be satisfied upon the target base station using the same radio access technology as the base station. In one particular embodiment, the tenth criterion may be satisfied upon both the base station and the target base station using NR (and may not be satisfied by the base station and the target base station using different RATs or the same RAT which is not NR).

Thus the description above sets out up to ten different criteria which may be used by the base station to determine whether or not to include the set of capabilities for the wireless device in the handover message. Any one of these criteria may be employed by the base station on its own. However, one or more (or all) of the criteria may be combined by the base station to determine whether or not to include the set of capabilities for the wireless device in the handover message. The base station may employ any suitable rule for combining the criteria. For example, the base station may consider the criteria satisfied (and thus include the set of capabilities in the handover message) if at least one of the multiple criteria is satisfied, only if all of the multiple criteria are satisfied, or if some number or threshold portion of the multiple criteria are satisfied. Those skilled in the art will also appreciate that certain criteria may be considered more important than others when combining criteria in this way. Thus whether or not an individual criterion is met may be weighted according to its importance when combined with other criteria.

In step 1004, the base station causes the handover message to be transmitted to the target base station. The handover message may be transmitted directly to the target base station, over a direct interface between them (e.g., X2, Xn, etc) or indirectly via one or more core networks (e.g., over one or more S1 or N2 interfaces). Where the method of FIG. 10 is performed by a base station having transmission capabilities, step 1004 may comprise the base station transmitting the handover message itself. Where the method of FIG. 10 is performed by a base station without transmission capabilities (e.g., in a logical node or base station), step 1004 may comprise the base station instructing another node (e.g., a remote radio unit or similar) to transmit the handover message.

Figure 11:
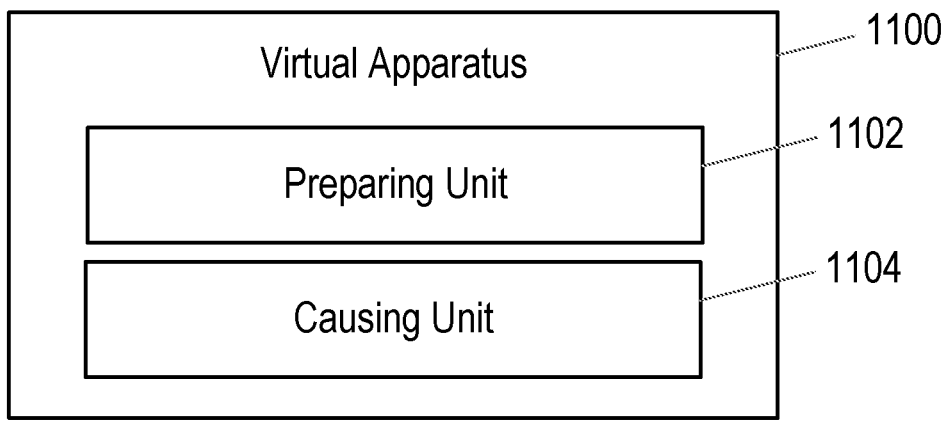
FIG. 11 shows a virtualization apparatus in accordance with some embodiments.

FIG. 11 shows a virtualization apparatus in accordance with some embodiments. FIG. 11 illustrates a schematic block diagram of an apparatus 1100 in a wireless network (for example, the wireless network shown in FIG. 1). The apparatus may be implemented in a wireless device or network node (e.g., wireless device 110 or network node 160 shown in FIG. 1). Apparatus 1100 is operable to carry out the example method described with reference to FIG. 10 and possibly any other processes or methods disclosed herein. It is also to be understood that the method of FIG. 10 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause preparing unit 1102 and causing unit 1104, and any other suitable units of apparatus 1100 to perform corresponding functions according one or more embodiments of the present disclosure.

As illustrated in FIG. 11, apparatus 1100 includes preparing unit 1102 and causing unit 1104. The apparatus 1100 may be implemented in a base station acting as a source base station for handover of a wireless device to a target base station. Preparing unit 1102 is configured to prepare a handover message for transmission to the target base station, the handover message comprising an indication of an identity associated with a set of capabilities of the wireless device. Causing unit 1104 is configured to cause the handover message to be transmitted to the target base station. Preparing unit 1102 is additionally configured to selectively include the set of capabilities of the wireless device in the handover message based on one or more criteria.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein. For the avoidance of doubt, the following numbered statements set out embodiments of the disclosure.

Group B Embodiments

1. A method performed by a base station, the method comprising, when the base station is acting as a source base station for handover of a wireless device to a target base station:
    preparing a handover message for transmission to the target base station, the handover message comprising an indication of an identity associated with a set of capabilities of the wireless device; and
    causing the handover message to be transmitted to the target base station,
    wherein the step of preparing the handover message comprises selectively including the set of capabilities of the wireless device in the handover message based on one or more criteria.
2. The method of embodiment 1, wherein the one or more criteria comprise a first criterion based on a capacity of one or more interfaces involved in the handover of the wireless device.
3. The method of embodiment 2, wherein the first criterion is satisfied upon the capacity of the one or more interfaces exceeding a threshold capacity.
4. The method of any one of the preceding embodiments, wherein the one or more criteria comprise a second criterion based on a load on one or more interfaces involved in the handover of the wireless device.
5. The method of embodiment 4, wherein the second criterion is satisfied upon the load on the one or more interfaces being less than a threshold load.
6. The method of any one of embodiments 2 to 5, wherein the one or more interfaces comprise one or more of: one or more X2 interfaces; one or more S1 interfaces; one or more Xn interfaces, and one or more N2 interfaces.
7. The method of any one of the preceding embodiments, wherein the one or more criteria comprise a third criterion based on a type of one or more interfaces involved in the handover of the wireless device.
8. The method of embodiment 7, wherein the third criterion is satisfied upon the type of one or more interfaces including an N2 interface.
9. The method of embodiment 7, wherein the third criterion is satisfied upon the type of one or more interfaces including an X2 interface.

10. The method of any one of the preceding embodiments, wherein the one or more criteria comprise a fourth criterion based on a network slice in which the wireless device is configured.
11. The method of embodiment 10, wherein the fourth criterion is satisfied upon the wireless device being configured in a high-priority or delay-sensitive network slice.
12. The method of embodiment 10, wherein the fourth criterion is satisfied upon the wireless device being configured in a network slice handling ultra-reliable low-latency communications, URLLC.
13. The method of any one of the preceding embodiments, wherein the one or more criteria comprise a fifth criterion based on a quality-of-service flow handled by the wireless device.
14. The method of embodiment 13, wherein the fifth criterion is satisfied upon the wireless device handling a quality-of-service flow with high priority or low-latency requirements.
15. The method of any one of the preceding embodiments, wherein the one or more criteria comprise a sixth criterion based on one or more identities with which the base station is pre-provisioned.
16. The method of embodiment 15, wherein the sixth criterion is satisfied upon the identity associated with the set of capabilities of the wireless device not belonging to the one or more identities with which the base station is pre-provisioned.
17. The method of any one of the preceding embodiments, wherein the one or more criteria comprise a seventh criterion based on whether the identity associated with the set of capabilities of the wireless device was assigned by a manufacturer of the wireless device.
18. The method of embodiment 17, wherein the seventh criterion is satisfied upon the identity associated with the set of capabilities of the wireless device not being assigned by the manufacturer of the wireless device.
19. The method of any one of the preceding embodiments, wherein the one or more criteria comprise an eighth criterion based on whether the identity associated with the set of capabilities of the wireless device was assigned by one or more network nodes.
20. The method of embodiment 19, wherein the eighth criterion is satisfied upon the identity associated with the set of capabilities of the wireless device being assigned by one or more network nodes.
21. The method of any one of the preceding embodiments, wherein the one or more criteria comprise a ninth criterion based on a prevalence of the identity associated with the set of capabilities of the wireless device.
22. The method of embodiment 21, wherein the ninth criterion is satisfied upon the prevalence of the identity being less than a threshold.
23. The method of any one of the preceding embodiments, wherein the one or more criteria comprise a tenth criterion based on whether the target base station uses the same or a different radio access technology as the base station.
24. The method of embodiment 23, wherein the tenth criterion is satisfied upon the target base station using the same radio access technology as the base station.
25. The method of any one of the preceding embodiments, wherein the identity is mappable to the set of capabilities.
26. The method of any one of the preceding embodiments, wherein the identity is mappable to the set of capabilities by one or more of: the target base station and a core network entity, such as an access and mobility management function, AMF, or a UE capability management function, UCMF.
27. The method of any one of the preceding embodiments, wherein the identity comprises a radio capability signaling, RACS, identity.
28. The method of any one of the preceding embodiments, wherein the base station and the target base station are both capable of handling identities associated with sets of capabilities (e.g., are both RACS capable)
29. The method of any of the previous embodiments, further comprising:
obtaining user data; and
forwarding the user data to a host computer or a wireless device.

Group C Embodiments

30. A base station, comprising:
processing circuitry configured to perform any of the steps of any of the Group B embodiments;
power supply circuitry configured to supply power to the base station.
31. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.
32. The communication system of the previous embodiment further including the base station.
33. The communication system of the previous 2 embodiments, further including the UE, wherein the UE is configured to communicate with the base station.
34. The communication system of the previous 3 embodiments, wherein:
the processing circuitry of the host computer is configured to execute a host application, thereby providing the user data; and
the UE comprises processing circuitry configured to execute a client application associated with the host application.
35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.
36. The method of the previous embodiment, further comprising, at the base station, transmitting the user data.
37. The method of the previous 2 embodiments, wherein the user data is provided at the host computer by executing a host application, the method further comprising, at the UE, executing a client application associated with the host application.

38. A user equipment (UE) configured to communicate with a base station, the UE comprising a radio interface and processing circuitry configured to performs the of the previous 3 embodiments.
39. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
40. The communication system of the previous embodiment further including the base station.
41. The communication system of the previous 2 embodiments, further including the UE, wherein the UE is configured to communicate with the base station.
42. The communication system of the previous 3 embodiments, wherein:
   the processing circuitry of the host computer is configured to execute a host application;
   the UE is configured to execute a client application associated with the host application, thereby providing the user data to be received by the host computer.

APPENDIX: INTER-NODE SIGNALING OF UE CAPABILITIES

1. Introduction

The following sections discuss inter-node signaling of UE Capabilities with RACS.

2. Discussion 2.1 Signalling of UE Capabilities in the UE Radio Access Capability Information Transparent Container In legacy systems, the transparent container 'UE Radio Access Capability Information' is used to upload UE capabilities to the AMF after they have been uploaded from the UE. The container may later be downloaded from the AMF when the UE registers to a new cell after idle mode mobility.

With RACS, the only time when the UE capabilities are uploaded from the UE is when the UE have no valid capability ID, or the ID is not known in the system. Therefor it is not possible for the gNB to include the capability ID in the transparent container.

When the UE registers to a new cell after Idle mode mobility, the gNB will receive the capability ID from the AMF. In 23.501 it is stated:
   The sewing AMF stores the UE Radio Capability ID for a UE in the UE context and provides this UE Radio Capability ID to NG-RAN as part of the UE context information using N2 signalling.

Observation 1 The UE Radio Access Capability Information is only sent from the gNB when there is no capability ID recognized in the system. Therefor there is no use to add the capability ID to the message.

2.2 Signalling of UE Capabilities at HO

In RAN2 #108, it was concluded that more feedback would be needed from RAN3 to decide on the usage of the UE capability ID in handover.
   R2-1915079 UE radio capability ID exchange over X2/Xn and S1/NG interface ZTE Corporation, Sanechips discussion Rel-16 RACS-RAN-Core R2-1912672
   ZTE thinks we can wait for RAN3 feedback
   Mediatek/Intel agree
   We wait for RAN3 feedback first
Besides the discussion on the UE capability ID, it is valid to discuss the transfer of UE radio access capabilities as such, from RAN2 point of view.

In 23.502, in the Handover procedures section, it is stated:
   If the source NG RAN and target NG RAN support RACS as defined in TS 23.501121 the Source to Target transparent container shall contain the UE's UE Radio Capability ID instead of UE radio access capabilities.

It is questionable that the capability ID is replacing the UE radio access capabilities. This may increase the HO delay with one round-trip between the gNB and AMF for unusual UE models. It may not be feasible to keep a cache of the capability ID's of all UE models in the gNB, so for more unusual models, if the UE capabilities are not sent at HO, the gNB will have to request it from the AMF.

Unusual models might be smartphones models that are very new, old or not marketed in the current country, or it could also be specialized equipment for public safety or critical IoT. For these models there will be extra HO delay each time the UE makes a HO to a new cell.

If the text in 23.502 is changed so that the UE radio access capabilities may be omitted if there is a capability ID, it will be up to implementation/configuration if the UE capabilities are sent for UE's using RACS. It will then be possible to minimize delay by always sending the UE capabilities with the capability ID, or minimize load on internal interfaces by never sending the UE capabilities with the capability ID. It could also be considered that the source gNB may include both the capability ID and UE capabilities in the HO preparation message e.g.: if the source gNB consider the capability ID unusual, the capability ID was not pre-provisioned in the system or the UE have active delay sensitive QoS flows.

There is also minimal 38.331 impact associated with this behavior. The UE capabilities are sent in the HO transparent container sent in UE-CapabilityRAT-ContainerListIE, defined as:
   UE-CapabilityRAT-ContainerList
   The IE UE-CapabilityRAT-ContainerList contains a list of radio access technology specific capability containers.

| UE-CapabilityRAT-ContainerList information element |
|---|

```
-- ASN1START
-- TAG-UE-CAPABILITYRAT-CONTAINERLIST-START
UE-CapabilityRAT-ContainerList ::= SEQUENCE (SIZE (0..maxRAT-CapabilityContainers)) OF UE-
CapabilityRAT-Container
UE-CapabilityRAT-Container ::=                    SEQUENCE {
    rat-Type                                      RAT-Type,
    ue-CapabilityRAT-Container                    OCTET STRING
```

| UE-CapabilityRAT-ContainerList information element |
|---|
| }<br>-- TAG-UE-CAPABILITYRAT-CONTAINERLIST-STOP<br>-- ASN1STOP |

It should be noted that the size of the UE-CapabilityRAT-ContainerList may be 0. Therefore, based on the ASN.1 code, it is possible, in principle, to not send any UE capabilities in the HO preparation message.

Observation 2 No changes are needed to the ASN code in 38.331 in order to make it optional to send UE capability information.

Therefore, it would basically only be needed to update the note below from 38.331 describing which RAT containers should be included in the HO Preparation Information, to make an exception for RACS case. A TP is included in Appendix B.

NOTE 1: The following table indicates per source RAT whether RAT capabilities are included or not.

| Source RAT | NR capabilites | E-UTRA capabilities | MR-DC capabilities |
|---|---|---|---|
| NR | Included | May be included | May be included |
| E-UTRAN | Included | May be included | May be included |

NOTE 2: The following table indicates, in case of inter-RAT handover from E-UTRA, which additional IEs are included or not:

| Source system | sourceConfig | rrm-Config | as-Context |
|---|---|---|---|
| E-UTRA/EPC | Not included | May be included | Not included |
| E-UTRA/5GC | May be included, but only radioBearerConfig is included in the RRCReconfiguration. | May be included | Not included |

Proposal 1 It is agreed that, for RACS, it should be optional to include the UE capabilities in the HO preparation transparent container.

Proposal 2 An LS is sent to SA2, informing them that RAN 2 agreed that it should be optional to send the UE capabilities for an UE with capability ID.

A draft LS text and a TP for the proposal above are provide below.

3. Conclusion

In section 0 we made the following observations:

Observation 1 The UE Radio Access Capability Information is only sent from the gNB when there is no capability ID recognized in the system. Therefor there is no use to add the capability ID to the message.

Observation 2 No changes are needed to the ASN code in 38.331 in order to make it optional to send UE capability information.

Based on the discussion in section 0 we propose the following:

Proposal 1 It is agreed that, for RACS, it should be optional to include the UE capabilities in the HO preparation transparent container.

Proposal 2 An LS is sent to SA2, informing them that RAN 2 agreed that it should be optional to send the UE capabilities for an UE with capability ID.

4. References

[1] 38.331, Radio Resource Control (RRC) protocol specification, V15.8.0 (2019-12)
[2] 23.501, System architecture for the 5G System (5GS)

APPENDIX A: DRAFT LS

1. Overall Description

In 23.502, in the Handover procedures section, it is stated:
If the source NG RAN and target NG RAN support RACS as defined in TS 23.501[2], the Source to Target transparent container shall contain the UE's UE Radio Capability ID instead of UE radio access capabilities.

However, this may increase the HO delay with one round-trip between the gNB and AMF for unusual UE models. It may not be feasible to keep a cash of the capability ID's of all UE models in the gNB, so for more unusual models, if the UE capabilities are not sent at HO, the gNB will have to request it from the AMF.

Therefore, from RAN2 point of view, it should be optional whether if the UE capabilities are included in the HO preparation command or not, so that the network performance can be optimized with regards to HO delay and load on internal interfaces.

It is suggested to take the above into consideration and adjust the text in 23.502 accordingly.

APPENDIX B

TP for 38.331

- HandoverPreparationInformation
This message is used to transfer the NR RRC information used by the target gNB during handover preparation or
UE context retieval, e.g. in case of resume or re-establishment, including UE capability information. This
message is also used for transferring the information between the CU and DU.
    Direction: source gNB/source RAN to target gNB or CU to DU.
                                                HandoverPreparationInformation message
-- ASN1START
-- TAG-HANDOVER-PREPARATION-INFORMATION-START
HandoverPreparationInformation ::=   SEQUENCE {
    criticalExtensions                   CHOICE {

APPENDIX B-continued

TP for 38.331

```
        c1                              CHOICE{
            handoverPreparationInformation   HandoverPreparationInformation-IEs,
            spare3 NULL, spare2 NULL, spare1 NULL
        },
        criticalExtensionsFuture          SEQUENCE { }
    }
}
HandoverPreparationInformation-IEs ::= SEQUENCE {
    ue-CapabilityRAT-List             UE-CapabilityRAT-ContainerList,
    sourceConfig                      AS-Config                              OPTIONAL, -- Cond HO
    rrm-Config                        RRM-Config                             OPTIONAL,
    as-Context                        AS-Context                             OPTIONAL,
    nonCriticalExtension              SEQUENCE { }                           OPTIONAL
}
AS-Config ::=                         SEQUENCE {
    rrcReconfiguration                OCTET STRING (CONTAINING RRCReconfiguration),
    ...,
    [[
    sourceRB-SN-Config                OCTET STRING (CONTAINING RadioBearerConfig)   OPTIONAL,
    sourceSCG-NR-Config               OCTET STRING (CONTAINING RRCReconfiguration)  OPTIONAL,
    sourceSCG-EUTRA-Config            OCTET STRING                           OPTIONAL
    ]],
    [[
    sourceSCG-Configured              ENUMERATED {true}                      OPTIONAL
    ]]
}
AS-Context ::=                        SEQUENCE {
    reestablishmentInfo               ReestablishmentInfo                    OPTIONAL,
    configRestrictInfo                ConfigRestrictInfoSCG                  OPTIONAL,
    ...,
    [[ ran-NotificationAreaInfo       RAN-NotificationAreaInfo               OPTIONAL
    ]],
    [[ ueAssistanceInformation        OCTET STRING (CONTAINING UEAssistanceInformation) OPTIONAL   -- Cond HO2
    ]],
    [[
    selectedBandCombinationSN         BandCombinationInfoSN                  OPTIONAL
    ]]
}
ReestablishmentInfo ::=               SEQUENCE {
    sourcePhysCellId                  PhysCellId,
    targetCellShortMAC-I              ShortMAC-I,
    additionalReestabInfoList         ReestabNCellInfoList                   OPTIONAL
}
ReestabNCellInfoList ::=   SEQUENCE ( SIZE (1..maxCellPrep) ) OF ReestabNCellInfo
ReestabNCellInfo::= SEQUENCE{
    cellIdentity                      CellIdentity,
    key-gNodeB-Star                   BIT STRING (SIZE (256)),
    shortMAC-I                        ShortMAC-I
}
RRM-Config ::=                        SEQUENCE {
    ue-InactiveTime                   ENUMERATED {
                                        s1, s2, s3, s5, s7, s10, s15, s20,
                                        s25, s30, s40, s50, min1, min1s20, min1s40,
                                        min2, min2s30, min3, min3s30, min4, min5, min6,
                                        min7, min8, min9, min10, min12, min14, min17, min20,
                                        min24, min28, min33, min38, min44, min50, hr1,
                                        hr1min30, hr2, hr2min30, hr3, hr3min30, hr4, hr5, hr6,
                                        hr8, hr10, hr13, hr16, hr20, day1, day1hr12, day2,
                                        day2hr12, day3, day4, day5, day7, day10, day14, day19,
                                        day24, day30, dayMoreThan30}          OPTIONAL,
    candidateCellInfoList   MeasResultList2NR                                 OPTIONAL,
    ...,
    [[
    candidateCellInfoListSN-EUTRA   MeasResultServFreqListEUTRA-SCG           OPTIONAL
    ]]
}
-- TAG-HANDOVER-PREPARATION-INFORMATION-STOP
-- ASN1STOP
```

| HandoverPreparationInformation field descriptions |
| --- |
| as-Context
Local RAN context required by the target gNB or DU.
rrm-Config
Local RAN context used mainly for RRM purposes.
sourceConfig
The radio resource configuration as used in the source cell.
ue-CapabilityRAT-List
The UE radio access related capabilities concerning RATs supported by the UE. A gNB that retrieves MRDC related capability containers ensures that the set of included MRDC containers is consistent w.r.t. the feature set related information.
ue-InactiveTime
Duration while UE has not received or transmitted any user data. Thus the timer is still running in case e.g., UE measures the neighbour cells for the HO purpose. Value s1 corresponds to 1 second, s2 corresponds to 2 seconds and so on. Value min1 corresponds to 1 minute, value min1s20 corresponds to 1 minute and 20 seconds, value min1s40 corresponds to 1 minute and 40 seconds and so on. Value hr1 corresponds to 1 hour, hr1min30 corresponds to 1 hour and 30 minutes and so on. |

| AS-Config field descriptions |
| --- |
| rrcReconfiguration
Contains the RRCReconfiguration configuration as generated entirely by the MN.
sourceRB-SN-Config
Contains the IE RadioBearerConfig as generated entirely by the SN. This field is only used when the UE is configured with SN terminated RB(s).
sourceSCG-Configured
Value true indicates that the UE is configured with NR or EUTRA SCG in source configuration. The field is only used in NR-DC and NE-DC and is included only if the fields sourceSCG-NR-Config and sourceSCG-EUTRA-Config are absent.
sourceSCG-EUTRA-Config
Contains the current dedicated SCG configuration in RRCConnectionReconfiguration message as specified in TS 36.331 [10] and generated entirely by the SN. In this version of the specification, the E-UTRA RRCConnectionReconfiguration message can only include the field scg-Configuration. This field is only used in NE-DC.
sourceSCG-NR-Config
Contains the current dedicated SCG configuration in RRCReconfiguration message as generated entirely by the SN. In this version of the specification, the RRCReconfiguration message can only include fields secondaryCellGroup and measConfig. This field is only used in NR-DC. |

| AS-Context field descriptions |
| --- |
| selectedBandCombinationSN
Indicates the band combination selected by SN in (NG)EN-DC, NE-DC, and NR-DC.
ueAssistanceInformation
Includes for each UE assistance feature the information last reported by the UE, if any. |

| RRM-Config field descriptions |
| --- |
| candidateCellInfoList
A list of the best cells on each frequency for which measurement information was available
candidateCellInfoListSN-EUTRA
A list of EUTRA cells including serving cells and best neighbour cells on each serving frequency, for which measurement results were available. This field is only used in NE-DC. |

| Conditional Presence | Explanation |
| --- | --- |
| HO | The field is mandatory present in case of handover within NR or UE context retrieval, e.g. in case of resume or re-establishment. The field is optionally present in case of handover from E-UTRA/5GC. Otherwise the field is absent. |
| HO2 | The field is optionally present in case of handover within NR; otherwise the field is absent. |

NOTE 1:
NOTE 2: The following table indicates per source RAT whether RAT capabilities are included or not when RACS is not used for the UE. If RACS is used for the UE, all UE radio access capabilities are optional.

| Source RAT | NR capabilities | E-UTRA capabilities | MR-DC capabilities |
| --- | --- | --- | --- |
| NR | Included | May be included | May be included |
| E-UTRAN | Included | May be included | May be included |

NOTE 3: The following table indicates, in case of inter-RAT handover from E-UTRA, which additional IEs are included or not:

| Source system | sourceConfig | rrm-Config | as-Context |
| --- | --- | --- | --- |
| E-UTRA/EPC | Not included | May be included | Not included |
| E-UTRA/5GC | May be included, but only radioBearerConfig is included in the RRCReconfiguration. | May be included | Not included |

The invention claimed is:

1. A method performed by a base station, the method comprising, when the base station is acting as a source base station for handover of a wireless device to a target base station:
preparing a handover message for transmission to the target base station; and
causing the handover message to be transmitted to the target base station,
wherein the step of preparing the handover message comprises deciding whether to include in the handover message only an identity associated with a set of capabilities of the wireless device or include in the handover message both the identity associated with the set of capabilities and the set of capabilities, in dependence on at least one of: a capacity of one or more interfaces involved in the handover of the wireless device, or a load on the one or more interfaces.

2. The method of claim 1, wherein both the identity associated with the set of capabilities and the set of capabilities are included in the handover message responsive to the capacity of the one or more interfaces exceeding a threshold capacity.

3. The method of claim 1, wherein both the identity associated with the set of capabilities and the set of capabilities are included in the handover message responsive to the load of the one or more interfaces being less than a threshold load.

4. The method of claim 2, wherein preparing the handover message comprises deciding that the capacity of the one or more interfaces is sufficient for including both the identity associated with the set of capabilities and the set of capabilities responsive to determining that the one or more interfaces comprise one or more X2 interfaces or one or more N2 interfaces.

5. A base station configured to act as a source base station handing over a wireless device to a target base station, the base station comprising:

processing circuitry configured to:
prepare a handover message for transmission to the target base station, the handover message including an indication of an identity associated with a set of capabilities of the wireless device; and
cause the handover message to be transmitted to the target base station,
wherein the step of preparing the handover message comprises deciding whether to include only the identity associated with the set of capabilities or include both the identity associated with the set of capabilities and the set of capabilities, in dependence on at least one of: a capacity of one or more interfaces involved in the handover of the wireless device, or a load on the one or more interfaces; and power supply circuitry configured to supply power to the base station.

* * * * *